United States Patent
Schmidt et al.

(10) Patent No.: US 11,407,500 B2
(45) Date of Patent: Aug. 9, 2022

(54) LANDING GEAR WITH SHORTENING MOTION

(71) Applicants: Robert Kyle Schmidt, Brooklin (CA); Steve Amberg, Toronto (CA); Michael Saccoccia, Seagrave (CA)

(72) Inventors: Robert Kyle Schmidt, Brooklin (CA); Steve Amberg, Toronto (CA); Michael Saccoccia, Seagrave (CA)

(73) Assignee: SAFRAN LANDING SYSTEMS CANADA, INC., Ajax (CA)

( * ) Notice: Subject to any disclaimer, the term of this patent is extended or adjusted under 35 U.S.C. 154(b) by 64 days.

(21) Appl. No.: 17/021,541

(22) Filed: Sep. 15, 2020

(65) Prior Publication Data

US 2022/0081105 A1     Mar. 17, 2022

(51) Int. Cl.
| | | |
|---|---|---|
| *B64C 25/10* | (2006.01) | |
| *B64C 25/34* | (2006.01) | |
| *B64C 25/60* | (2006.01) | |
| *B64C 25/12* | (2006.01) | |
| *B64C 25/00* | (2006.01) | |

(52) U.S. Cl.
CPC .............. *B64C 25/34* (2013.01); *B64C 25/60* (2013.01); *B64C 25/10* (2013.01); *B64C 2025/008* (2013.01); *B64C 2025/125* (2013.01)

(58) Field of Classification Search
CPC ... B64C 25/10; B64C 25/60; B64C 2025/125; B64C 2025/008
See application file for complete search history.

(56) References Cited

U.S. PATENT DOCUMENTS

| | | | | |
|---|---|---|---|---|
| 3,870,254 A | * | 3/1975 | Watts | ...................... B64C 25/26 244/102 SL |
| 5,299,761 A | * | 4/1994 | Robin | ...................... B64C 25/20 244/102 R |

(Continued)

FOREIGN PATENT DOCUMENTS

| | | |
|---|---|---|
| CA | 2 972 157 A1 | 1/2018 |
| EP | 0 560 649 A1 | 9/1993 |

(Continued)

OTHER PUBLICATIONS

International Search Report and Written Opinion dated Dec. 9, 2021, issued in corresponding International Application No. PCT/CA2021/051267, filed Sep. 13, 2021, 13 pages.

*Primary Examiner* — Tye William Abell
(74) *Attorney, Agent, or Firm* — Christensen O'Connor Johnson Kindness PLLC

(57) ABSTRACT

A landing gear for a vehicle includes a strut configured for reciprocating movement between a stowed position and a deployed position. A shock absorber has a first element slidingly disposed within the strut and a second element slidingly coupled to the first element. A trailing arm is rotatably coupled to the second element. A first linkage is coupled to the first element, wherein the first linkage drives the first element between a raised position when the strut is in the stowed position and a lowered position when the strut is in the deployed position. The landing gear further includes a second linkage coupled to the trailing arm. The second linkage rotates the trailing arm between a first trailing arm position when the strut is in the stowed position and a second trailing arm position when the strut is in the deployed position.

16 Claims, 13 Drawing Sheets

(56) References Cited

U.S. PATENT DOCUMENTS

| | | |
|---|---|---|
| 10,442,527 B2 | 10/2019 | Bennett |
| 2018/0162522 A1* | 6/2018 | Luce ........................ B64C 25/22 |
| 2018/0244372 A1* | 8/2018 | Simpson ................. B64C 25/34 |
| 2018/0346102 A1* | 12/2018 | Dahl ....................... B64C 25/04 |
| 2019/0270513 A1* | 9/2019 | Cottet ..................... B64C 25/12 |
| 2020/0010178 A1* | 1/2020 | Bennett .................. B64C 25/60 |

FOREIGN PATENT DOCUMENTS

| | | |
|---|---|---|
| EP | 3263449 A1 | 1/2018 |
| EP | 3 354 564 A1 | 8/2018 |
| EP | 3 366 578 A1 | 8/2018 |
| FR | 92984 E | 1/1969 |
| GB | 1010920 A | 11/1965 |
| GB | 2 237 781 A | 5/1991 |

\* cited by examiner

LANDING GEAR WITH SHORTENING MOTION

BACKGROUND

An aircraft landing gear bay is a space within an aircraft that is configured to accommodate a stowed landing gear. The landing gear is typically designed specifically for the aircraft, and the landing gear bay is designed to accommodate the landing gear.

In an effort to increase fuel efficiency, existing aircraft are often reconfigured to use larger gas turbine engines. In order to provide sufficient ground clearance for these larger engines, the landing gear is lengthened to raise the aircraft relative to the ground when supported by the landing gear. However, these longer landing gears must still fit into existing landing gear bays when retracted.

Even when the landing gear bay may be designed to accommodate longer landing gear, such as for new aircraft, it is beneficial to maintain a smaller the landing gear bay. The inboard boundary of the landing gear envelope is limited by the keel beam, which extends along the centerline of the aircraft. Accordingly, longer landing gear would typically be attached further out on the wing; however, moving the attachment point of the landing gear outboard in this manner increases the size of taxiway and runway needed for the aircraft. Moving the attachment point of the landing gear further outboard can also result in increased airport fees, which are often based, in part, on the width from one landing gear wheel to the opposite one.

In view of the foregoing, it is advantageous to provide a landing gear with an increased length when extended that does not require a larger landing gear bay. As a result, a means to maintain the length of the landing gear in the extended position but reduce it during retraction is desirable.

One shortening system is disclosed in U.S. Pat. No. 10,442,527 ("Bennett"), issued Oct. 15, 2019, and currently assigned to Safran Landing Systems UK LTD, the disclosure of which is expressly incorporated herein. Bennett teaches an aircraft landing gear in which a shock absorber extends from and retracts into the landing gear strut as the landing gear moves toward a deployed position and a stowed position, respectively. Because the landing gear wheels are coupled to the shock absorber, retracting the shock absorber into the strut when the landing gear moves toward the stowed position reduces the overall length of the stowed landing gear as compared to the extended landing gear.

"Shortening" systems such as included on the landing gear disclosed in Bennett are limited in the total amount of length reduction they are capable of providing. In some cases the amount of shortening provided may be less than is desired or necessary. Accordingly, there is a need for landing gear with improved shortening capabilities.

SUMMARY

Embodiments of a landing gear with a shortening mechanism for aircraft are set forth below according to technologies and methodologies of the present disclosure. The shortening mechanism mechanically draws the shock absorber up within the landing gear strut. The shortening mechanism also provides a rotatable trailing arm for mounting one or more wheels to the landing gear. When the landing gear moves from a stowed position to a deployed position, the trailing arm rotates to move the one or more wheels toward the upper end of the landing gear, thereby further shortening the overall length of the landing gear.

A representative embodiment of a landing gear of a vehicle includes a strut configured for reciprocating movement between a stowed position and a deployed position. A shock absorber has a first element slidingly disposed within the strut and a second element slidingly coupled to the first element. A trailing arm is rotatably coupled to the first element, and a first end of the trailing arm has a wheel rotatably mounted thereto. A first linkage is coupled to the second element to drive the second element between a raised position when the strut is in the stowed position and a lowered position when the strut is in the deployed position. A second linkage is coupled to the trailing arm to rotate the trailing arm between a first trailing arm position when the strut is in the stowed position and a second trailing arm position when the strut is in the deployed position.

In any embodiment, the first linkage comprises a first link rotatably coupled at a first end to the strut and rotatably coupled at a second end to a first end of a second link, the second link being coupled at a second end to the first element.

In any embodiment, the second link comprises a second link engagement surface that contacts an inner surface of the strut when the strut is in the deployed position, wherein an axial load applied to the shock absorber drives the second link engagement surface toward the inner surface of the strut.

In any embodiment, the landing gear further comprising a lever and a drive rod, the lever being fixedly coupled to the first link, and the drive rod having a first end pivotably coupled to the lever. Rotation of the drive rod moves the second link engagement surface away from the inner surface of the strut when the strut moves toward the stowed position.

In any embodiment, the strut is rotatably coupled about an axis, and the drive rod is pivotably coupled about a point, wherein the point is fixedly positioned relative to the axis.

In any embodiment, the second linkage comprises a positioning rod pivotably coupled to the lever, wherein rotation of the lever drives the positioning rod to rotate the trailing arm.

In any embodiment, the second linkage further comprises a positioning link rotatably mounted to the strut, and a drop link rotatably mounted at a first end to the positioning link and rotatably mounted at a second end to a second end of the trailing arm.

In any embodiment, the landing gear further comprises a strut engagement surface formed on the strut and a positioning link engagement surface formed on the positioning link, wherein the strut engagement surface engages the positioning link engagement surface when the strut is in the deployed position.

In any embodiment, a tensile load applied to the drop link when the strut is in the deployed position urges the positioning link engagement surface toward the strut engagement surface.

In any embodiment, the tensile load in the drop link is reacted into the strut through contact between the positioning link engagement surface and the strut engagement surface.

In any embodiment, the tensile load in the drop link results from a vertical load applied to the wheel.

In any embodiment, the landing gear further comprises a side brace coupled at one end to the strut, wherein a first end of the second linkage is coupled to the side brace, and a second end of the second linkage is coupled to the trailing arm, movement of the side brace as the landing gear reciprocates between the deployed position and the stowed position rotating the trailing arm.

In any embodiment, the second linkage comprises a positioning link rotatably mounted to the strut. A drop link is rotatably mounted at a first end to the positioning link and rotatably mounted at a second end to a second end of the trailing arm.

In any embodiment, the landing gear further includes a rotary actuator operably coupled to the second linkage and configured to rotate the trailing arm as the landing gear reciprocates between the deployed position and the stowed position.

In any embodiment, the second linkage further comprises a positioning link rotatably mounted to the strut. A drop link is rotatably mounted at a first end to the positioning link and rotatably mounted at a second end to a second end of the trailing arm.

In any embodiment, the first element is a piston, and the second element is a cylinder, wherein the piston is partially disposed within the cylinder.

In any embodiment, the first element is a cylinder, and the second element is a piston partially disposed within the cylinder.

Another representative embodiment of a landing gear is an aircraft landing gear that includes a strut configured for reciprocating movement between a stowed position and a deployed position. The landing gear comprises a shock absorber having a cylinder and a piston, wherein a first end of the piston is slidingly disposed within the strut and a second end of the piston is slidingly disposed within the cylinder, which extends from an end of the strut. A trailing arm is rotatably coupled to the cylinder, and a first end of the trailing arm has a wheel rotatably mounted thereto. The landing gear further includes a first linkage and a second linkage. The first linkage is coupled to the piston and drives the piston between a raised position when the strut is in the stowed position and a lowered position when the strut is in the deployed position. The second linkage is coupled to the trailing arm and rotates the trailing arm between a first trailing arm position when the strut is in the stowed position and a second trailing arm position when the strut is in the deployed position.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Examples of a landing gear with a shortening mechanism are set forth below according to technologies and methodologies of the present disclosure. In an embodiment, the shortening mechanism retracts the shock absorber into the strut and also rotates a trailing arm to which the wheels are attached. The retraction of the shock absorber and the rotation of the trailing arm provide improved shortening of the landing gear as the landing gear moves from a deployed position to a stowed position.

Figure 1:
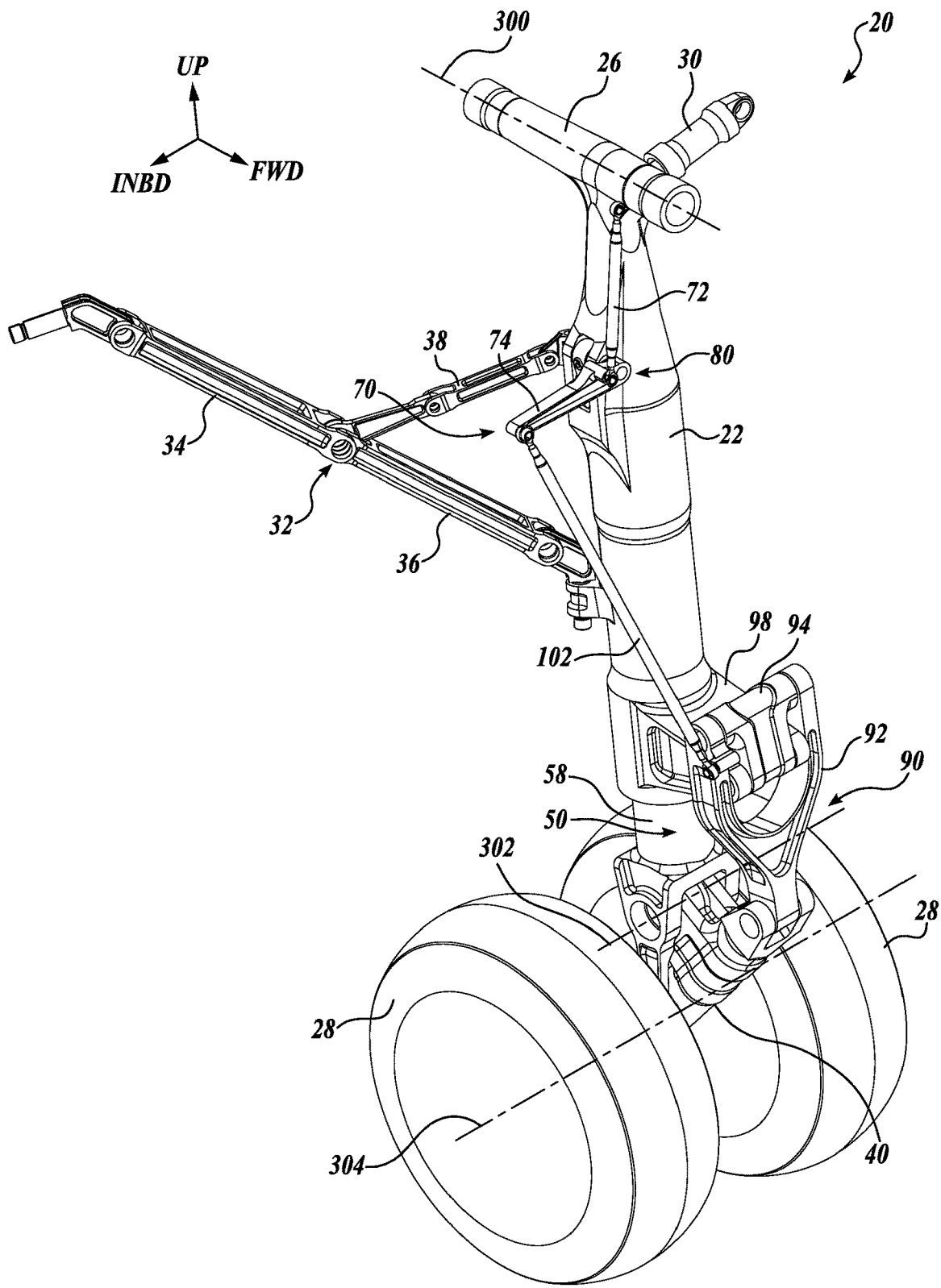
FIG. 1 shows a top-front-side isometric view of a first representative embodiment of a landing gear with a shortening mechanism according to the present disclosure, wherein the landing gear is in a deployed position and positioned on a left-hand side of an aircraft.
Figure 2:
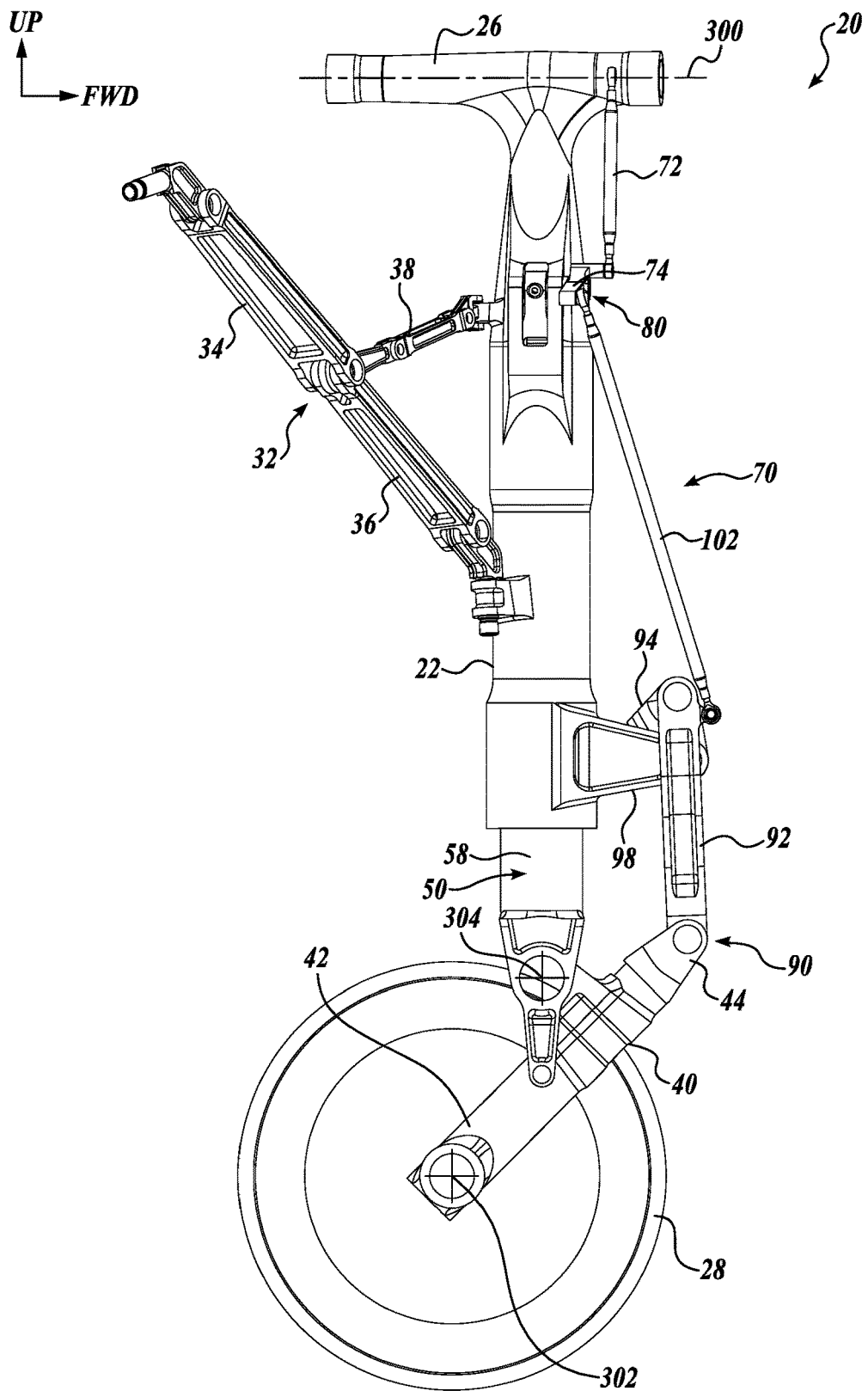
FIG. 2 shows a side elevational view thereof looking outboard.
Figure 3:
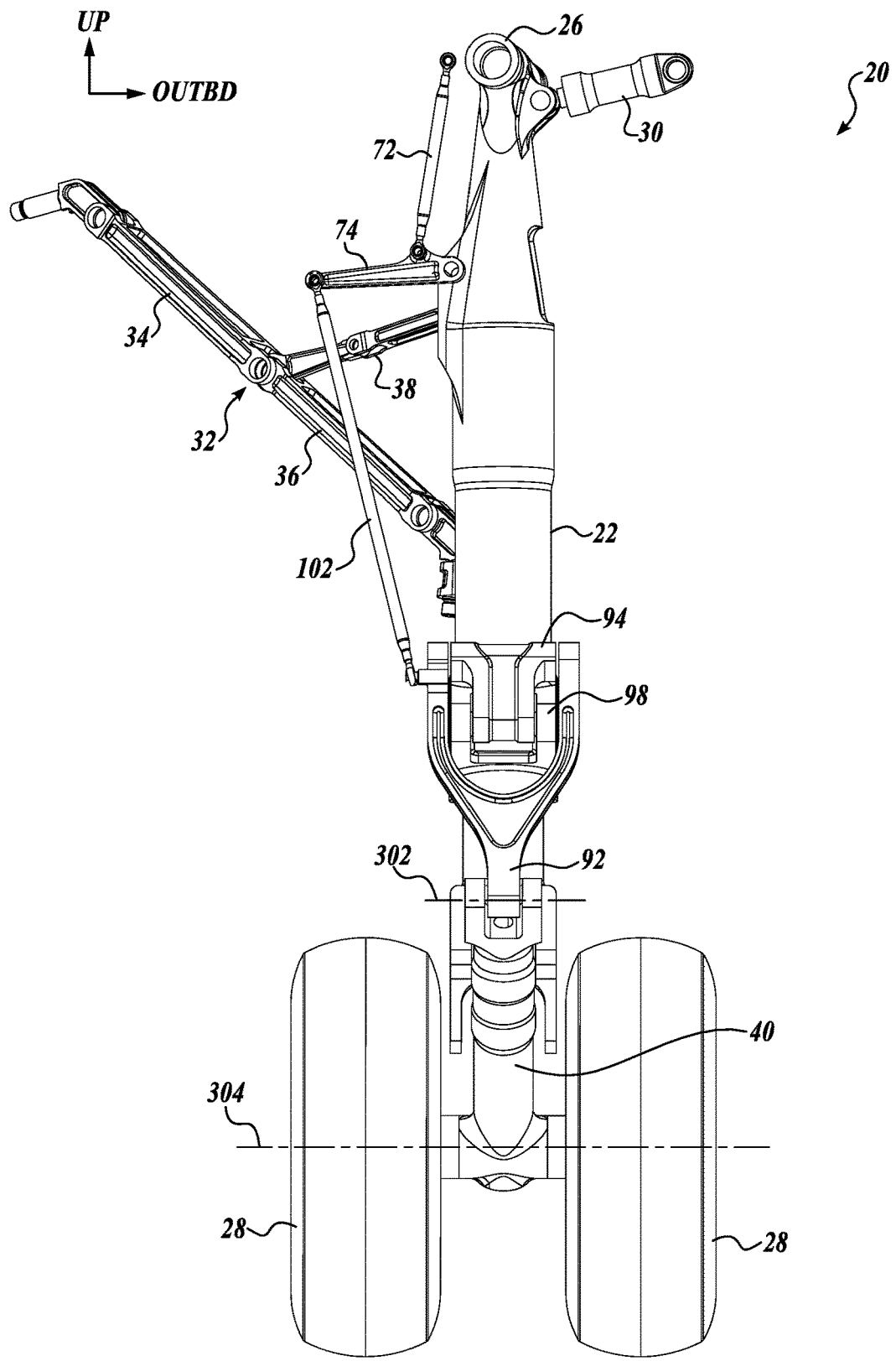
FIG. 3 shows a front elevational view thereof looking aft.
Figure 4:
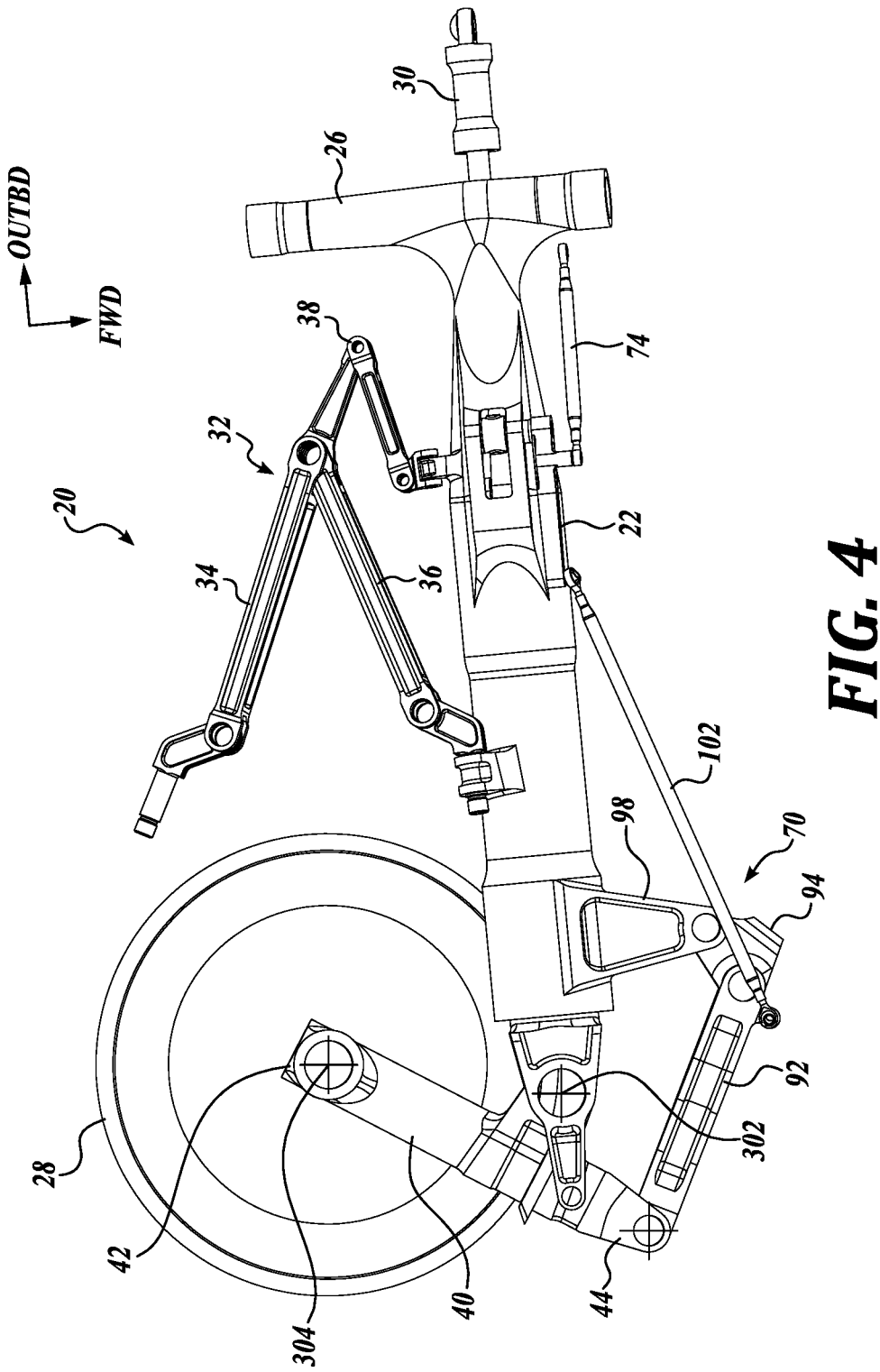
FIG. 4 shows a top view of the landing gear shown in FIG. 1 in a stowed position, wherein the view is taken along a wheel centerline.
Figure 5:
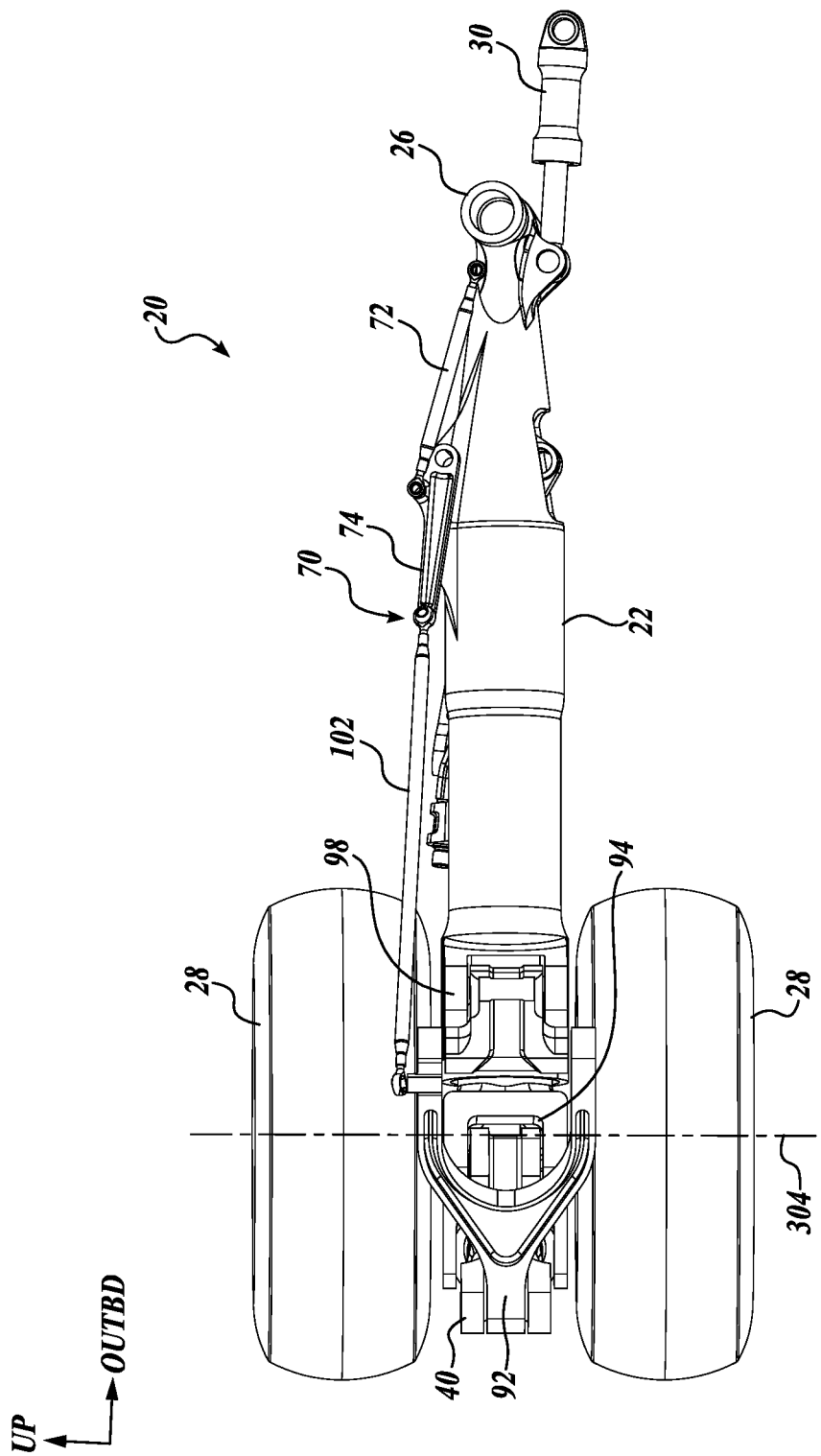
FIG. 5 shows a front view of the landing gear shown in FIG. 4, wherein the view is orthogonal to the wheel centerline.

FIGS. 1-5 show a representative embodiment of a landing gear 20 suitable for use on an aircraft. FIGS. 1-3 show the landing gear 20 a deployed position, and FIGS. 4 and 5 show the landing gear in a stowed position. While embodiments of various landing gear configurations are described herein with respect to aircraft, it will be appreciated that the landing gear configurations can be used with other suitable vehicles requiring retractable landing gear that reciprocate between stowed and deployed positions, including, for example, maglev vehicles.

In the disclosed embodiment, the landing gear 20 includes a strut 22 rotatably coupled to an aircraft (not shown) about the axis 300 of a trunnion 26. A shock absorber 50 extends from the end of the strut 22 opposite the trunnion 26. The landing gear 20 further includes a trailing arm 40 rotatably coupled at a central portion to the shock absorber 50 about an axis 302, and one or more wheels 34 rotatably coupled to a first end 42 of the trailing arm about axis 304. When the landing gear 20 is in the deployed position, and the aircraft is on the ground, the strut 22 extends in a downward direction from the aircraft, with the wheels contacting the ground to support at least a portion of the aircraft weight.

In the embodiment shown, a side brace 32 is provided, which includes a first link 34 having a first end rotatably coupled to a first end of a second link 36. The second end of the first link 34 is pivotably coupled to a portion of the aircraft, and the second end of the second link 36 is pivotably coupled to the strut 22. As shown in FIGS. 1-3, when the landing gear 20 is in a deployed position, the side brace 32 prevents rotation of the strut 22 about the trunnion centerline 300 to maintain the landing gear in the deployed position. A foldable lock link 38 selectively locks the side brace 32 in an extended state to secure the landing gear 20 in the deployed position. To move the landing gear 20 to the stowed position shown in FIGS. 4 and 5, the lock link 38 folds about a center axis, which unlocks the side brace 32, i.e., allows the first and second links 34 and 36 of the side brace 32 to rotate relative to each other.

An actuator 30 is connected to the strut 22 to drive the strut and, therefore, the landing gear 20, between the deployed and stowed positions. In the illustrated embodiment, the actuator 30 is a linear actuator rotatably coupled to the strut 22 such that extension of the actuator drives the landing gear 20 toward the stowed position and retraction of the actuator drives the landing gear toward the deployed position.

Embodiments of a disclosed shortening mechanism are described with respect to a typical cantilever landing gear; however, it will be appreciated that inclusion of the shortening mechanism is not limited to the illustrated landing gear. In this regard, the disclosed shortening mechanism may be included with any suitable landing gear, including landing gear with different actuators, linkages, positions on the aircraft, numbers of wheels, or any other variation, for which it is advantageous to shorten the landing gear as the landing gear moves from the deployed position to the stowed position.

Figure 6:
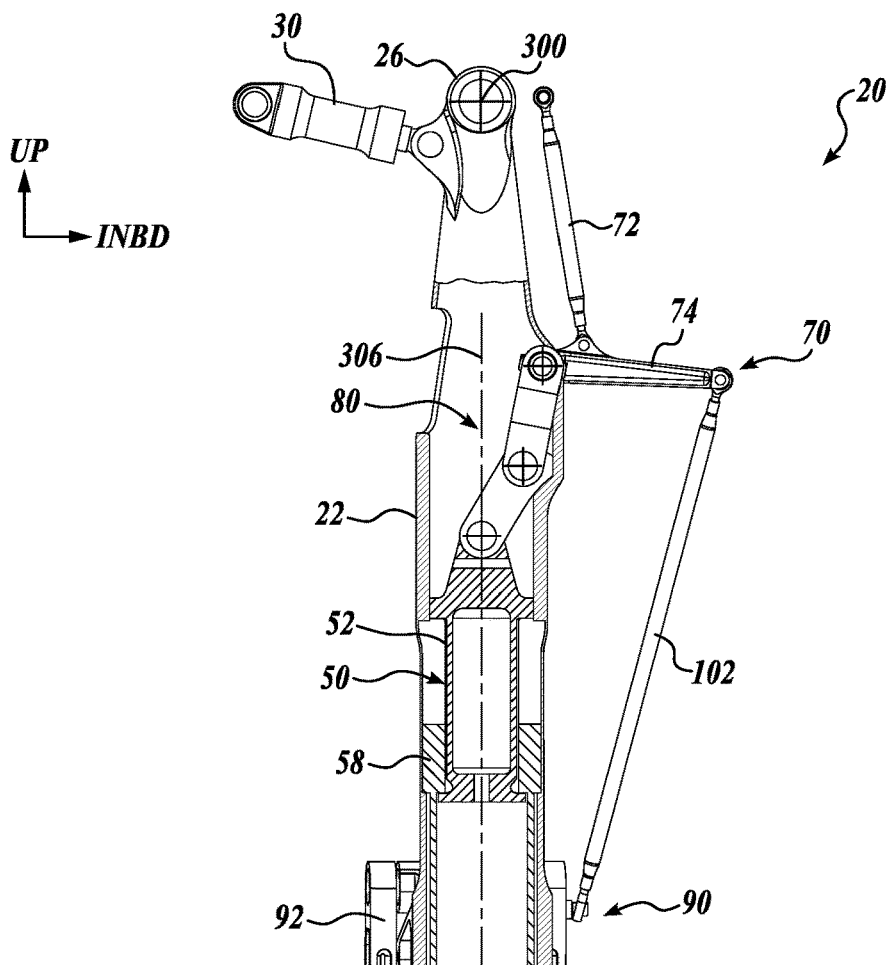
FIG. 6 shows a rear, partially cutaway view the landing gear shown in FIG. 1, wherein the landing gear is in the deployed position, and the view is taken along the centerline of the trunnion.
Figure 6:
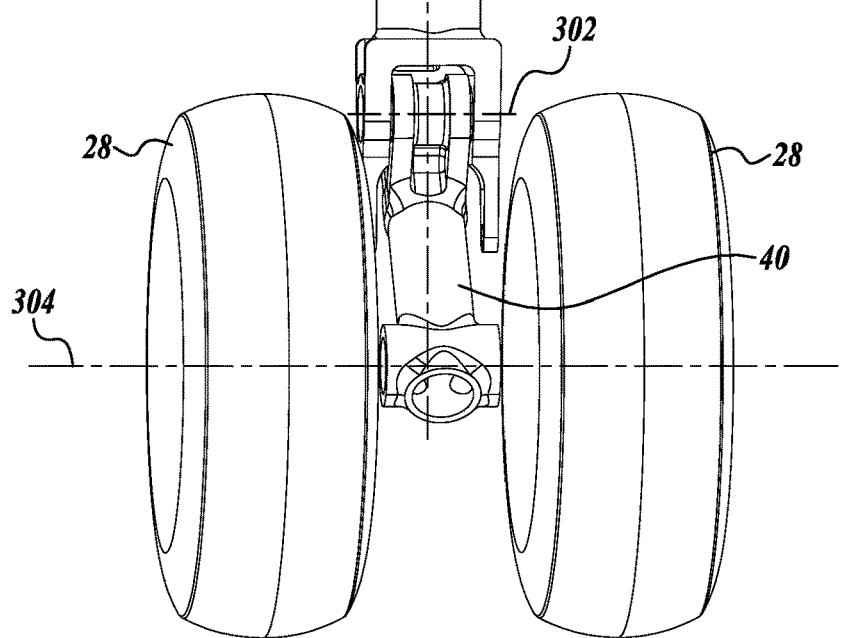
Figure 7:
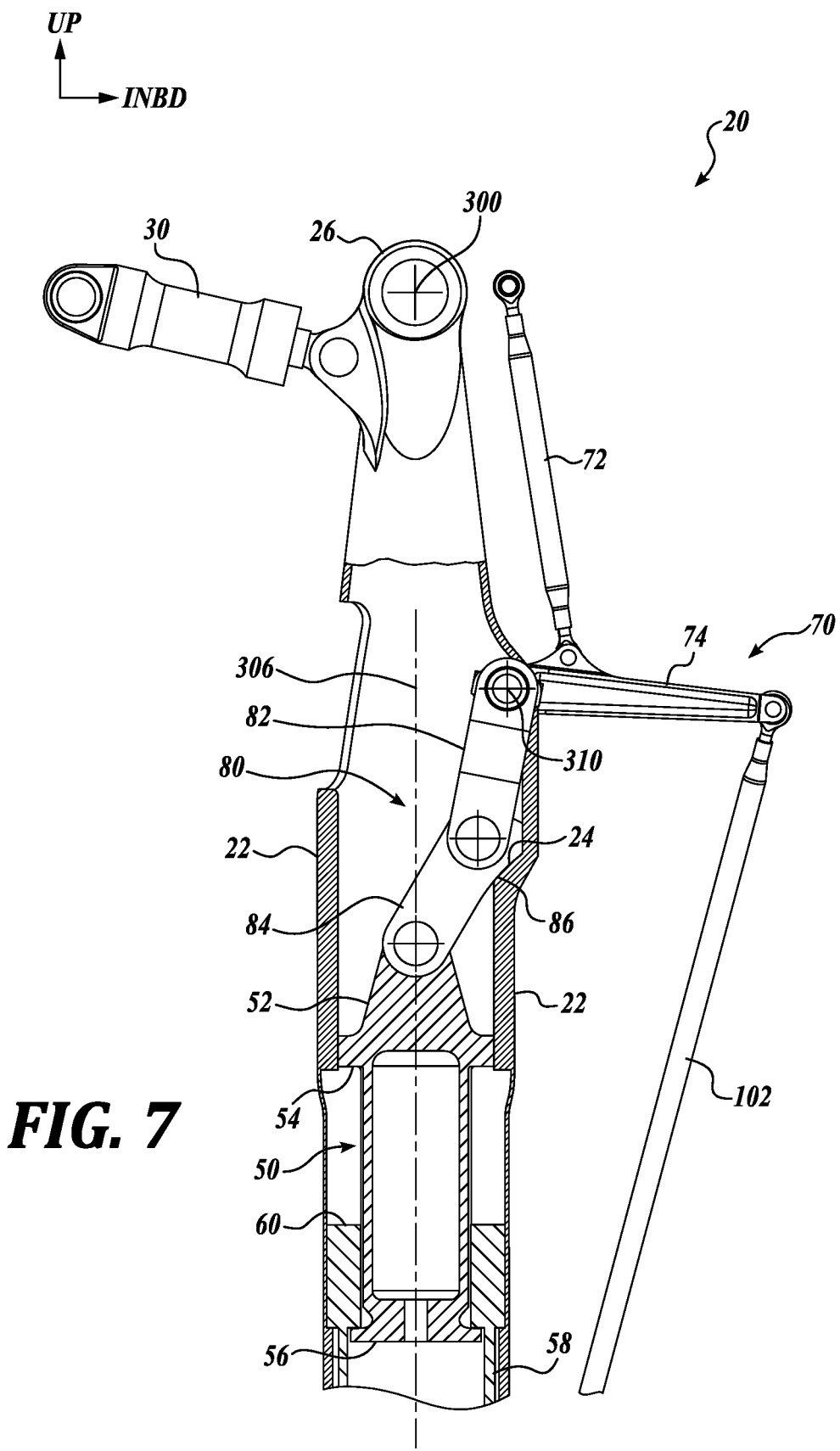
FIG. 7 shows an enlarged partial view of FIG. 6.
Figure 8:
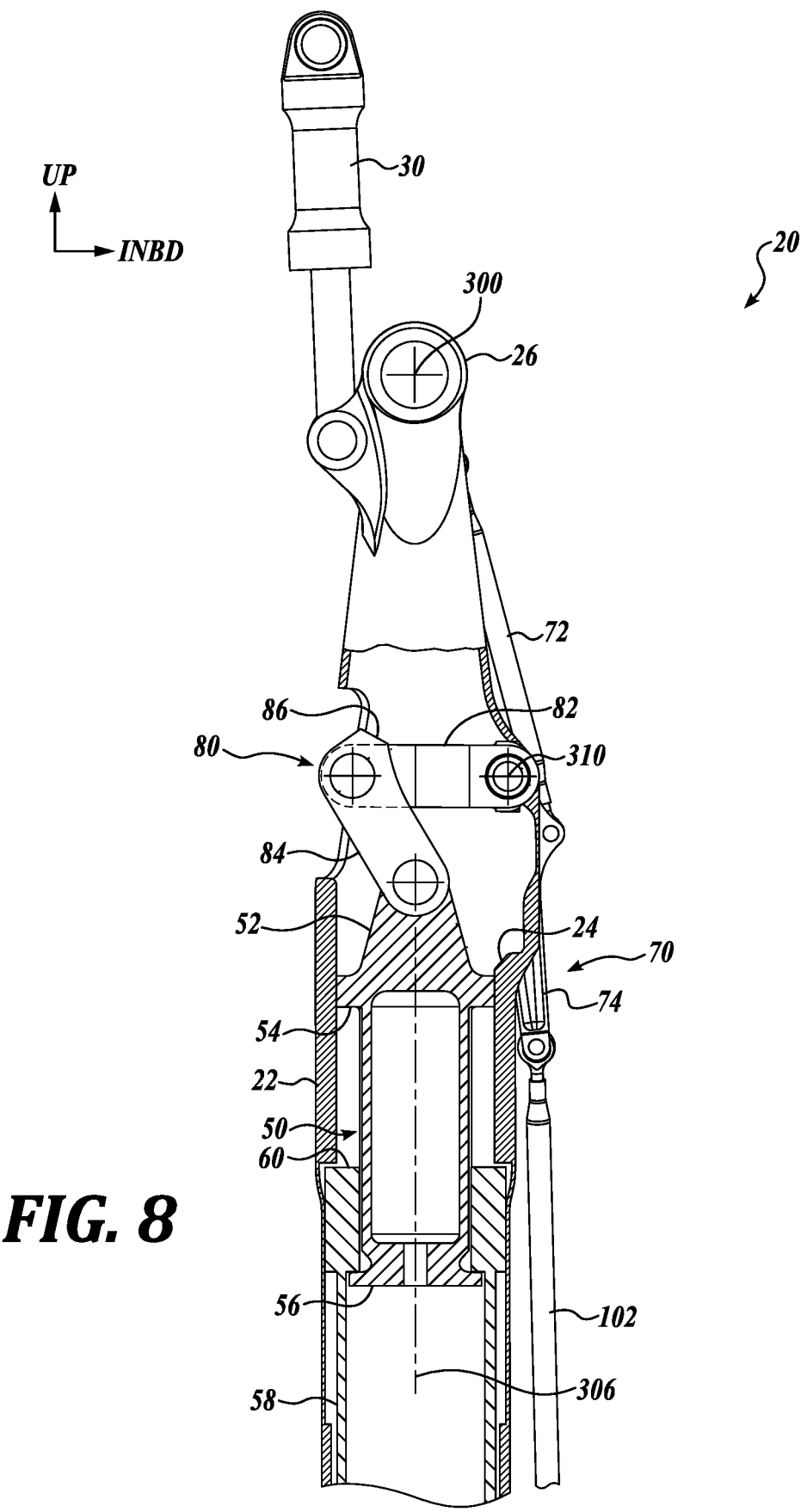
FIG. 8 shows a front, partially cutaway view of the landing gear shown in FIG. 1, wherein the landing gear is in the deployed position, and the view is taken along the centerline of the trunnion.

FIGS. 6-8 show an upper portion of the landing gear 20 that is configured to retract the shock absorber 50 into the strut as the landing gear moves from the deployed position (FIGS. 6 and 7) to the stowed position (FIG. 8), thereby shortening the landing gear 20.

As best shown in FIG. 6, the shock absorber 50 is disposed within a central portion of the strut 22 and is configured for sliding translation along the centerline 306 of the strut 22. In the illustrated embodiment, the shock absorber 50 includes a first element or piston 52 slidably disposed within a second element or cylinder 58. The second element 58 extends from a lower portion of the strut 22 (when the landing gear 20 is deployed), and the trailing arm 40 (to which the one or more wheels 28 are mounted) is coupled to the end of the second element. In this regard, the illustrated shock absorber 50 is configured to function in the manner of known telescoping shock absorbers typically used in landing gear.

The first element 52 includes a first annular protrusion 54 extending radially outward from a first end to engage an inner wall of the strut 22 to guide translation of the first element within the strut, as shown in FIGS. 7 and 8. The first element 52 further includes a second annular protrusion 56 extending radially outward and disposed within the second element 58. The second element 58 includes an annular protrusion 60 extending radially inward. Engagement of the second annular protrusion 56 of the first element 52 with the annular protrusion 60 of the second element 58 retains a portion of the first element within the second element when the shock absorber is in a fully extended position. This engagement also enables the first element 52 to retract the second element 58 into the strut 22 when the shortening mechanism moves the first element towards the trunnion 26, as described below.

Returning to FIG. 6, the landing gear 20 includes a linkage 70 that drives the shortening mechanism as the landing gear reciprocates between the stowed position and the deployed position. The linkage 70 has a drive rod 72 pivotably coupled at one end about a point 306 fixedly positioned relative to the axis 300 of the trunnion 26. A second end of the drive rod 72 is pivotably coupled to a lever 74, which is itself rotatably coupled to the strut 22 about an axis 310. The strut 22, lever 74, and drive rod 72 function as part of a 4-bar linkage so that as the actuator 30 rotates the strut 22 about axis 300, the drive rod drives rotation of the lever 74 relative to the strut 22. Rotation of the lever 74, in turn, drives the linkage 70 to retract the shock absorber 50 into the strut 22 and to rotate the trailing arm 40 to reposition the wheel(s) 28 closer to the trunnion 26.

Referring now to FIGS. 7 and 8, operation of a first portion 80 of the linkage 70 to retract the shock absorber 50 into the strut 22 will be described. The first portion 80 of the linkage 70 includes a first link 82 fixedly coupled at a first end to the lever 74 so that the first link rotates with the lever as the landing gear 20 reciprocates between the deployed position and the stowed position. A second end of the first link 82 is rotatably coupled to a first end of a second link 84. The second link 84 is also rotatably coupled to the first element 52 of the shock absorber 50.

When the landing gear 20 is in the deployed position shown in FIG. 7, the first element 52 of the shock absorber 50 is positioned such that the shock absorber is in an extended position relative to the strut 22. The strut 22 and the drive rod 72 are locked in place by the side brace 32 shown in FIGS. 1-3, which in turn locks the position of the first link 82, the second link 84, and the first element 52 of the shock absorber 50. Additionally, ground loads, which apply an upward axial force to the first element 52 of the shock absorber 50, are reacted into a side wall of the strut 22. More specifically, an upward force on the first element 52 of the shock absorber 50 tends to rotate the second link 84 clockwise as shown in FIG. 7, so that an engagement surface 86 formed on the second link 84 contacts an engagement surface 24 formed on an interior wall of the strut 22. Reacting ground loads into the strut 22 rather than through the drive rod 72 allows for a lighter, more compact drive rod design.

As the landing gear 20 moves toward the stowed position shown in FIG. 8, the drive rod 72 rotates the lever 74 about axis 310 so that the first link 82 rotates in a clockwise direction about axis 310 as shown in FIGS. 7 and 8. The clockwise rotation of the first link 82 raises the second link 84, which rotates in a counter-clockwise direction as shown in FIGS. 7 and 8 to disengage the engagement surface 86 of the second link from the engagement surface 24 of the strut 22. The clockwise rotation of the first link 82 also moves the second link 84 and, therefore, the first element 52 of the shock absorber 50 toward the trunnion 26. As the first element 52 of the shock absorber 50 moves toward the trunnion 26, the second radial protrusion 56 of the first element engages the first radial protrusion 60 of the second element 58 to retract the second element into the strut 22. Retraction of the shock absorber 50 into the strut 22 moves the trailing arm 40 and wheel(s) 28 toward the trunnion 26 to shorten the landing gear 20.

As the landing gear 20 moves from the stowed position of FIG. 8 to the deployed position of FIG. 7, the movement of the linkage 70 is reversed so that the linkage drives the shock absorber 50 to the extended position. More specifically, the lever 74 rotates the first link 82 in a counter-clockwise direction (as shown in FIGS. 7 and 8) to drive the shock absorber 50 and, more particularly, the second element 58 of the shock absorber, to the extended position.

The illustrated embodiment shows a shock absorber 50 wherein the first element 52 acts as a piston, and the second element 58 acts as cylinder in which the piston is slidably disposed. Other embodiments are contemplated in which the second element 58 is slidably disposed within the first element 52. That is, embodiments are contemplated in which the cylinder of the shock absorber 50 is coupled to second link 84, and the piston of the shock absorber extends from the strut 22 and has the trailing arm 40 rotatably coupled thereto.

Figure 9:
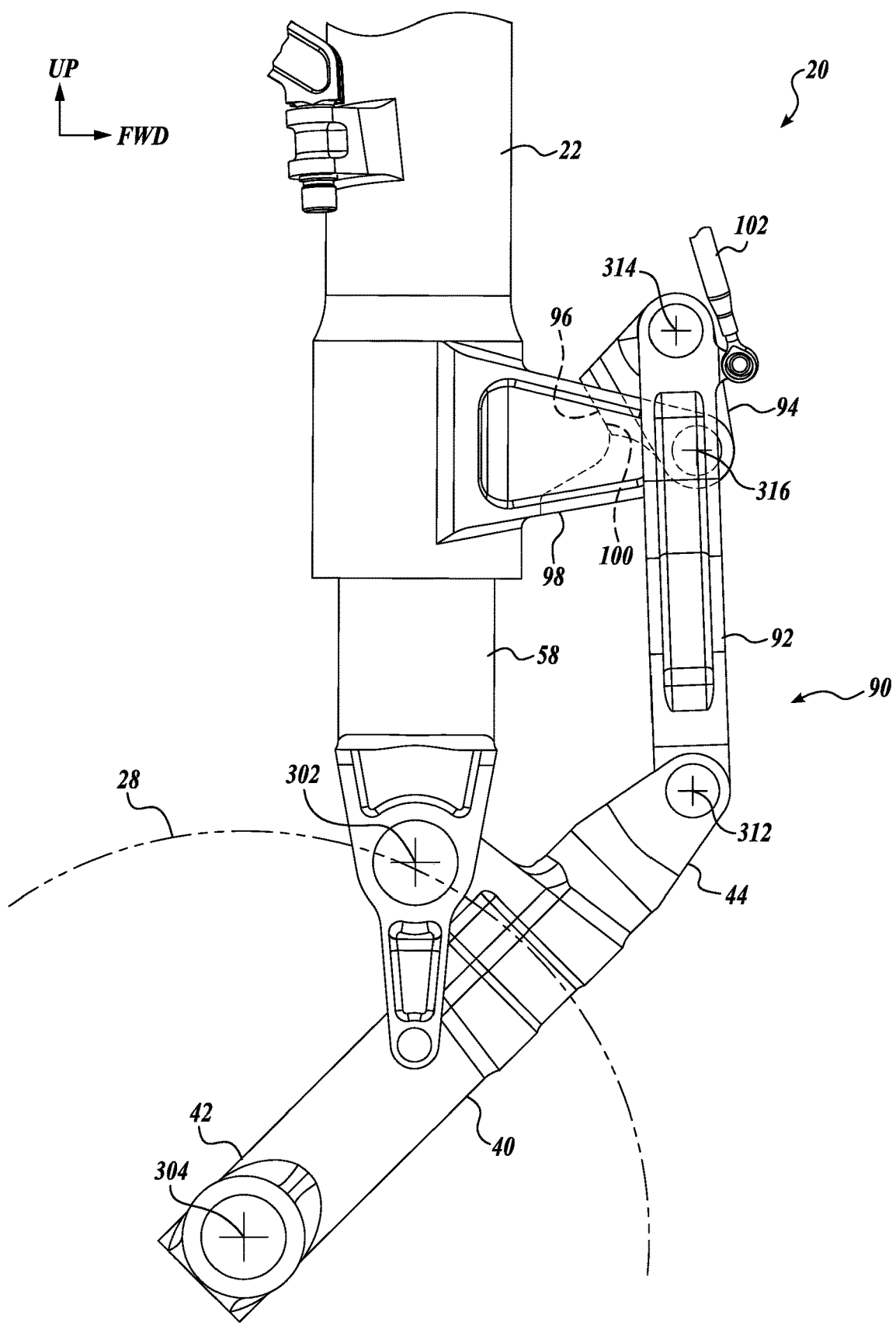
FIG. 9 shows an enlarged, partial view of FIG. 2.
Figure 10:
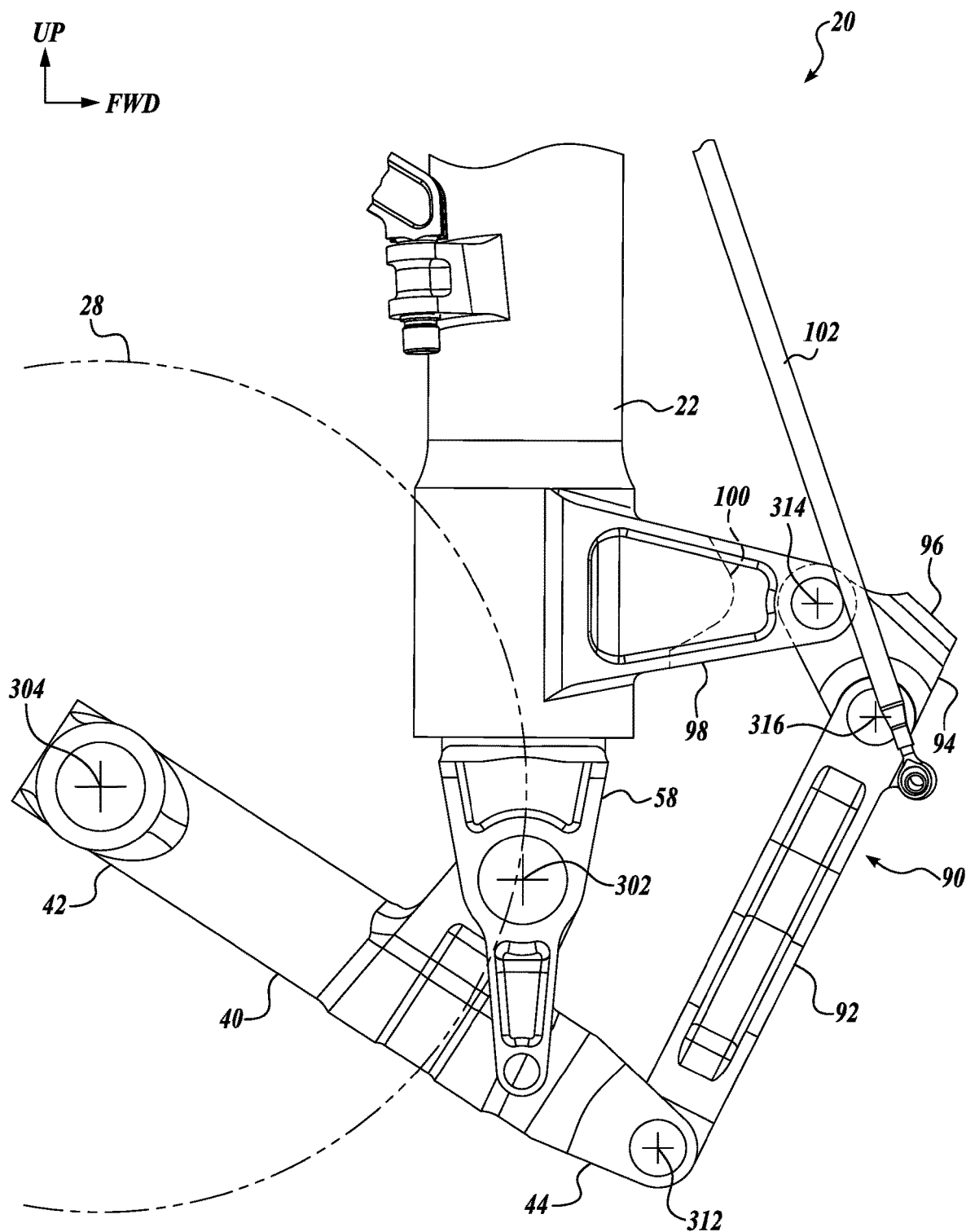
FIG. 10 shows an enlarged, partial view of FIG. 4.

FIGS. 9 and 10 show a lower portion of the landing gear 20 that is configured to move the one or more wheels 28 toward the trunnion 26 to shorten the landing gear. More specifically, a second portion 90 of the linkage 70 rotates the trailing arm 40 in a clockwise direction (as viewed in FIGS. 9 and 10) as the landing gear moves from the deployed position (FIG. 9) to the stowed position (FIG. 10).

Referring now to FIG. 9, the lower portion of the landing gear 20 is shown in the deployed position. The first end 42 of the trailing arm 40, to which the one or more wheels 28 are mounted, is in a lowered position. A second end 44 of the trailing arm 40, which is in a raised position, is rotatably coupled to a first end of a drop link 92 about an axis 312. A second end of the drop link 92 is rotatably coupled to a positioning link 94 about an axis 314, and the positioning link 94 is rotatably coupled about axis 316 to a clevis 98 extending laterally from the strut 22. A positioning rod 102 is pivotably coupled at one end to the positioning link 94. A second end of the positioning rod 102 is pivotably coupled the lever 74 (see FIGS. 6 and 7).

When the landing gear 20 is in a deployed position, and the aircraft is on the ground, the ground exerts an upward force on the one or more wheels 28 that imparts a moment that urges the trailing arm 40 in a clockwise direction (as shown in FIG. 9) about axis 302. This moment is reacted by the drop link 92 as tensile load in the drop link that pulls down on the positioning link 94 at axis 314. Because axis 314 is positioned aft of the axis 316, i.e., between axis 316 and the strut 22, the force applied by the drop link 92 to the positioning link tends to rotate the positioning link 94 in a counter-clockwise direction about axis 316 as viewed in FIG. 9 being in tension.

Still referring to FIG. 9, when the landing gear 20 is in the deployed position, an engagement surface 96 formed on the positioning link 94 engages an engagement surface 100 formed on the strut 22. As a result, most or all of the ground loads applied to the wheels 28 are reacted into the strut 22 instead of the positioning rod 102.

As the landing gear 20 moves from the deployed position shown in FIG. 9 to the stowed position shown in FIG. 10, the drive rod 72 rotates the lever 74 about axis 310, as previously described and shown in FIGS. 6-8. Rotation of the lever 74 drives the positioning rod 102 to rotate the positioning link 94 in a clockwise direction about axis 316 as viewed in FIGS. 9 and 10. The rotation of the positioning link 94 drives the drop link 92 to rotate the trailing arm 40 in a clockwise direction about axis 302. This rotation moves the one or more wheels 28 toward the trunnion 26 to shorten the length of the landing gear 20 as the landing gear moves toward the stowed position.

When the landing gear 20 moves from the stowed position shown in FIG. 10 to the deployed position shown in FIG. 9, the drive rod 72 rotates the lever 74 about axis 310 in the opposite direction, causing the positioning rod 102 to pull up on the positioning link 94 so that the positioning link rotates in a counter-clockwise direction about axis 34 until the engagement surface 96 of the positioning link 94 contacts the engagement surface 100 of the strut 22. This rotation results in the drop link 92 pulling up on the trailing arm 40 so that the trailing arm rotates the wheels 28 into the extended position.

The described landing gear 20 provides a shortening mechanism that retracts the shock absorber 50 into the strut 22 and also rotates the trailing arm 40 to move the wheels 28 toward the trunnion 26. These features are driven by a common linkage 70 and provide shortening of the landing gear 20 that is greater than either portion of the mechanism (shock absorber retraction and trailing arm rotation) can provide on its own.

Figure 11:
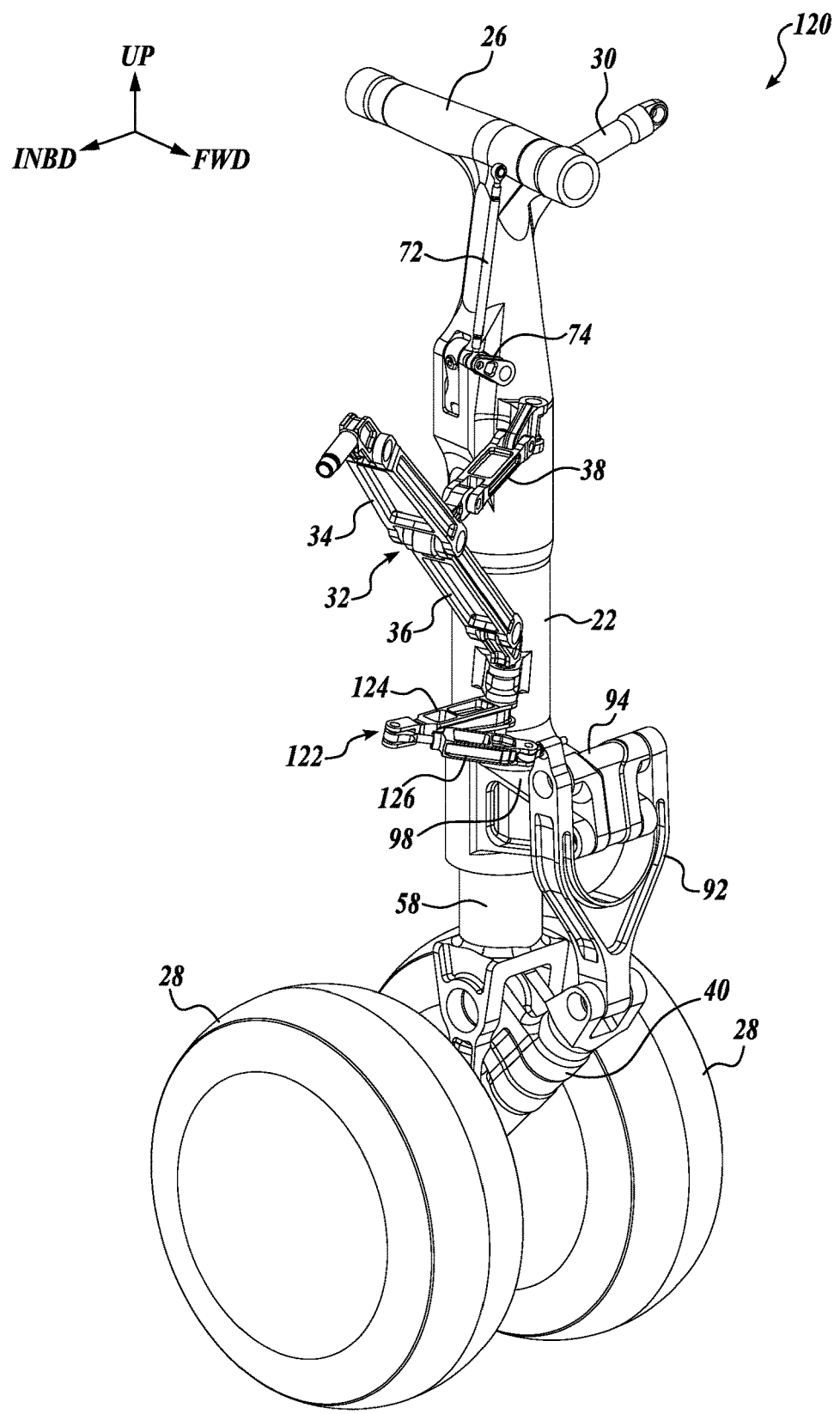
FIG. 11 shows a top-front-side isometric view of a second representative embodiment of a landing gear with a shortening mechanism according to the present disclosure, wherein the landing gear is in a deployed position.
Figure 12:
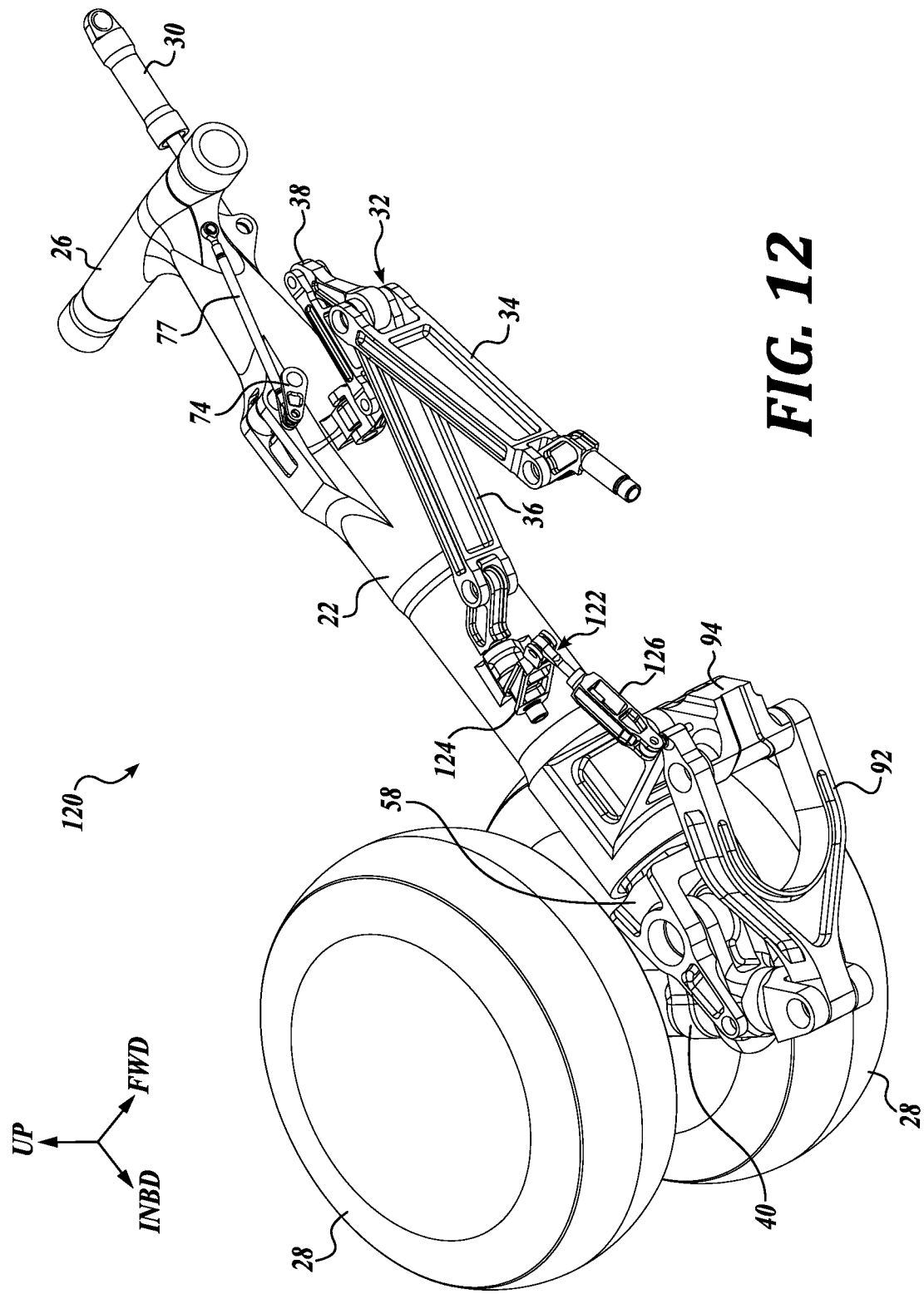
FIG. 12 shows a top-front-side isometric view of the landing gear shown in FIG. 11, wherein the landing gear is in a stowed position.

FIGS. 11 and 12 show a second representative embodiment of a landing gear 120 that uses an alternative linkage 70 to drive rotation of the trailing arm 40. The landing gear 120 of FIGS. 11 and 12 is similar to the previously described landing gear 20 shown in FIGS. 1-9 except as described below. Components are of landing gear 120 that are similar to corresponding components of landing gear 20 and are labeled with the same reference numbers and to avoid repetition, will not be described.

In the illustrated embodiment, rotation of the trailing arm 40 is not driven by a positioning rod coupled to the lever 74. Instead, a drive rodage 122 is actuated by movement of the side brace 32 as the landing gear 120 reciprocates between the deployed position (FIG. 11) and the stowed position (FIG. 12). The drive rodage 122 includes a first link 124 pivotably coupled to a second link 126. The first link 124 is coupled to the second link 36 of the side brace 32, and the second link 126 is pivotably coupled to the drop link 92.

As the landing gear 120 reciprocates between the deployed and stowed positions, the side brace 32 moves between an extended position and a retracted position. This movement of the side brace 32 rotates the second link 36 of the side brace relative to the strut 22, and the rotation of the second link of the side brace moves drive rodage 122 to drive the drop link 92 to rotate the trailing arm 40, thereby shortening the landing gear 120.

Figure 13:
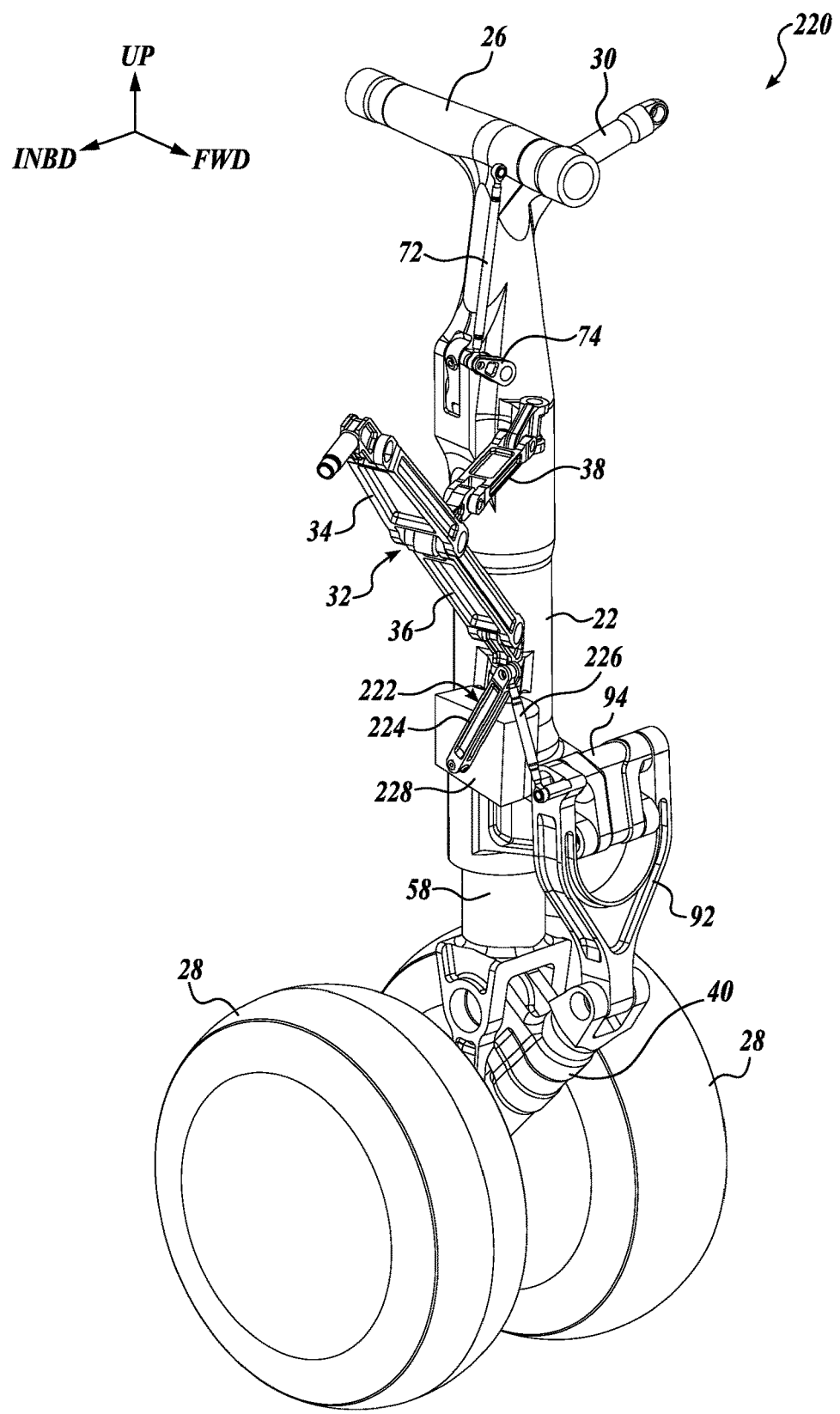
FIG. 13 shows a top-front-side isometric view of a third representative embodiment of a landing gear with a shortening mechanism according to the present disclosure, wherein the landing gear is in a deployed position.

FIG. 13 shows another alternate representative embodiment of a landing gear 220 that uses a rotary actuator 228 to drive rotation of the trailing arm 40. The landing gear 220 of FIG. 13 is similar to the previously described landing 20 shown in FIGS. 1-9 except as described below. Components are of landing gear 120 that are similar to corresponding components of landing gear 20 and are labeled with the same reference numbers and to avoid repetition, will not be described.

In the illustrated embodiment, the rotary actuator 228 is mounted to the strut 22 or other suitable structure. The rotary actuator 228 drives a linkage 222 coupled to the drop link 92 to rotate the trailing arm 40. More specifically, a first link 224 of the linkage 222 is rotated by the actuator 228. A second link 226 is pivotably coupled at one end to the first link 226 and at a second end to the drop link 92. As the landing gear 220 reciprocates between the deployed position (FIG. 11) and the stowed position (not shown), the actuator 228 drives the linkage 222 to rotate the trailing arm 40, thereby lengthening and shortening the landing gear 220.

The present application may reference quantities and numbers. Unless specifically stated, such quantities and numbers are not to be considered restrictive, but exemplary of the possible quantities or numbers associated with the present application. In this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the disclosed subject matter in which an exclusive property or privilege is claimed are defined as follows:

1. A landing gear for a vehicle, comprising:
   a strut configured for reciprocating movement between a stowed position and a deployed position;
   a shock absorber comprising a first element slidingly disposed within the strut and a second element slidingly coupled to the first element;
   a trailing arm rotatably coupled to the first element, a first end of the trailing arm having a wheel rotatably mounted thereto;
   a first linkage coupled to the second element, the first linkage driving the second element between a raised position when the strut is in the stowed position and a lowered position when the strut is in the deployed position;
   a lever coupled to the first linkage; and
   a second linkage coupled to the trailing arm and comprising a positioning rod pivotably coupled to the lever, wherein rotation of the lever drives the positioning rod to rotate the trailing arm between a first trailing arm position when the strut is in the stowed position and a second trailing arm position when the strut is in the deployed position.

2. The landing gear of claim 1, wherein the strut is rotatably coupled about an axis, and a drive rod is pivotably coupled about a point, the point being fixedly positioned relative to the axis.

3. The landing gear of claim 1, wherein the first element is a piston, and the second element is a cylinder, the piston being partially disposed within the cylinder.

4. The landing gear of claim 1, wherein the first element is a cylinder, and the second element is a piston partially disposed within the cylinder.

5. The landing gear of claim 1, wherein the first linkage comprises a first link rotatably coupled at a first end to the strut and rotatably coupled at a second end to a first end of a second link, the second link being coupled at a second end to the first element.

6. The landing gear of claim 5, the second link comprising a second link engagement surface that contacts an inner surface of the strut when the strut is in the deployed position, wherein an axial load applied to the shock absorber drives the second link engagement surface toward the inner surface of the strut.

7. The landing gear of claim 6, further comprising a drive rod, wherein the lever is fixedly coupled to the first link, and the drive rod has a first end pivotably coupled to the lever, rotation of the drive rod moving the second link engagement surface away from the inner surface of the strut when the strut moves toward the stowed position.

8. The landing gear of claim 1, the second linkage further comprising:
   a positioning link rotatably mounted to the strut; and
   a drop link rotatably mounted at a first end to the positioning link and rotatably mounted at a second end to a second end of the trailing arm.

9. The landing gear of claim 8, further comprising a strut engagement surface formed on the strut and a positioning link engagement surface formed on the positioning link, wherein the strut engagement surface engages the positioning link engagement surface when the strut is in the deployed position.

10. The landing gear of claim 9, wherein a tensile load applied to the drop link when the strut is in the deployed position urges the positioning link engagement surface toward the strut engagement surface.

11. The landing gear of claim 10, wherein the tensile load in the drop link is reacted into the strut through contact between the positioning link engagement surface and the strut engagement surface.

12. The landing gear of claim 11, wherein the tensile load in the drop link results from a vertical load applied to the wheel.

13. A landing gear for a vehicle, comprising:
   a strut configured for reciprocating movement between a stowed position and a deployed position;
   a shock absorber comprising a first element slidingly disposed within the strut and a second element slidingly coupled to the first element;
   a trailing arm rotatably coupled to the first element, a first end of the trailing arm having a wheel rotatably mounted thereto;
   a first linkage coupled to the second element, the first linkage driving the second element between a raised position when the strut is in the stowed position and a lowered position when the strut is in the deployed position;
   a second linkage coupled to the trailing arm, the second linkage rotating the trailing arm between a first trailing arm position when the strut is in the stowed position and a second trailing arm position when the strut is in the deployed position; and
   a side brace coupled at one end to the strut, wherein a first end of the second linkage is coupled to the side brace, and a second end of the second linkage is coupled to the trailing arm, movement of the side brace as the landing gear reciprocates between the deployed position and the stowed position rotating the trailing arm.

14. The landing gear of claim 13, the second linkage comprising:
   a positioning link rotatably mounted to the strut; and a drop link rotatably mounted at a first end to the positioning link and rotatably mounted at a second end to a second end of the trailing arm.

15. A landing gear for a vehicle, comprising:
a strut configured for reciprocating movement between a stowed position and a deployed position;
a shock absorber comprising a first element slidingly disposed within the strut and a second element sliding coupled to the first element;
a trailing arm rotatably coupled to the first element, a first end of the trailing arm having a wheel rotatably mounted thereto;
a first linkage coupled to the second element, the first linkage driving the second element between a raised position when the strut is in the stowed position and a lowered position when the strut is in the deployed position;
a second linkage coupled to the trailing arm, the second linkage rotating the trailing arm between a first trailing arm position when the strut is in the stowed position and a second trailing arm position when the strut is in the deployed position; and
a rotary actuator operably coupled to the second linkage and configured to rotate the trailing arm as the landing gear reciprocates between the deployed position and the stowed position.

16. The landing gear of claim 15, the second linkage further comprising:
a positioning link rotatably mounted to the strut; and
a drop link rotatably mounted at a first end to the positioning link and rotatably mounted at a second end to a second end of the trailing arm.

\* \* \* \* \*